(12) United States Patent
Kemper (10) Patent No.: US 12,051,890 B2
(45) Date of Patent: Jul. 30, 2024

(54) LINE-ROUTING DEVICE AND SIDE BRACKET AND LINK THEREFOR

(71) Applicant: TSUBAKI KABELSCHLEPP GMBH, Wenden-Gerlingen (DE)

(72) Inventor: Uwe Kemper, Kreuztal (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 0 days.

(21) Appl. No.: 17/768,638

(22) PCT Filed: Oct. 12, 2020

(86) PCT No.: PCT/EP2020/078570
§ 371 (c)(1),
(2) Date: Apr. 13, 2022

(87) PCT Pub. No.: WO2021/074062
PCT Pub. Date: Apr. 22, 2021

(65) Prior Publication Data
US 2024/0106218 A1  Mar. 28, 2024

(30) Foreign Application Priority Data
Oct. 16, 2019  (DE) ............... 20 2019 105 730.0

(51) Int. Cl.
*F16G 13/18* (2006.01)
*H02G 11/00* (2006.01)

(52) U.S. Cl.
CPC ........... *H02G 11/006* (2013.01); *F16G 13/18* (2013.01)

(58) Field of Classification Search
CPC ...... H02G 11/006; H02G 11/00; F16G 13/18; F16G 13/16; F16L 3/015
USPC .................. 174/135; 248/51, 49; 59/78.1
See application file for complete search history.

(56) References Cited

U.S. PATENT DOCUMENTS

| | | | | |
|---|---|---|---|---|
| 6,425,238 B1 * | 7/2002 | Blase | ............... | H02G 11/006 248/51 |
| 6,615,573 B2 * | 9/2003 | Blase | ............... | F16G 13/16 59/900 |
| 6,997,412 B2 * | 2/2006 | Komiya | ............... | F16G 13/16 59/900 |
| 8,459,000 B2 * | 6/2013 | Harada | ............... | H02G 11/006 59/900 |
| 2002/0124548 A1 * | 9/2002 | Blase | ............... | H02G 11/006 59/78.1 |

(Continued)

FOREIGN PATENT DOCUMENTS

| | | |
|---|---|---|
| DE | 19851340 A1 | 3/2000 |
| DE | 102004038817 A1 | 3/2005 |

(Continued)

*Primary Examiner* — Timothy J Thompson
*Assistant Examiner* — Michael F Mcallister
(74) *Attorney, Agent, or Firm* — BainwoodHuang (57) ABSTRACT

A side bracket is for a link for a line-routing device. The side bracket has a longitudinal periphery which extends in a longitudinal direction of the side bracket and on which a running surface is formed. The side bracket has a roller which is mounted so as to be rotatable about an axle. The axle is disposed so as to be parallel to the running surface and perpendicular to the longitudinal direction. A spacing between the running surface and the axle is variable in a damped manner. The roller, at least in a first position, protrudes from the running surface.

14 Claims, 4 Drawing Sheets

(56) References Cited

U.S. PATENT DOCUMENTS

| | | | | |
|---|---|---|---|---|
| 2005/0040275 | A1* | 2/2005 | Komiya | F16G 13/16 |
| | | | | 242/615.3 |
| 2007/0245705 | A1* | 10/2007 | Hermey | H02G 11/006 |
| | | | | 59/78.1 |
| 2007/0246599 | A1* | 10/2007 | Blase | H02G 11/006 |
| | | | | 242/899 |
| 2013/0025252 | A1* | 1/2013 | Harada | F16G 13/16 |
| | | | | 59/78.1 |

FOREIGN PATENT DOCUMENTS

| | | |
|---|---|---|
| DE | 102009033679 A1 | 3/2010 |
| DE | 102010035352 A1 | 3/2012 |
| EP | 2549144 A1 | 1/2013 |

\* cited by examiner

LINE-ROUTING DEVICE AND SIDE BRACKET AND LINK THEREFOR

The present invention relates to a side bracket for a link for a line-routing device, to a link for a line-routing device, and to a line-routing device.

Line-routing devices by way of which cables and/or hoses can be routed between members that are movable relative to one another are known from the prior art.

Line-routing devices typically form a loop composed of an upper lead, a deflection region, and a lower lead. The upper lead and the lower lead transition into one another by way of the deflection region. There are so-called self-supporting line-routing devices in which the upper lead and the lower lead do not contact one another. Moreover, there are also line-routing devices in which the upper lead bears on the lower lead. When the line-routing device is displaced, the upper lead in this case slides across the lower lead. This sliding action is impeded by friction. Moreover, wear on the line-routing chain often arises by virtue of the sliding action. Therefore, line-routing devices in which the sliding is to be facilitated by rollers are known. However, the rollers of the upper lead and of the lower lead here can collide with one another. This can lead to shocks which initiate undesirable vibrations in the line-routing devices.

Proceeding from the above, the present invention is based on the object of at least partially overcoming the issues known from the prior art and of providing in particular a line-routing device in which the upper lead and the lower lead are able to be mutually displaced with particularly little friction and vibration. Furthermore to be provided are a link for such a line-routing device, and a side bracket for such a link.

These objects are achieved by the features disclosed herein. Further advantageous design embodiments of the invention are set forth herein. The features disclosed herein can be combined with one another in a technologically expedient manner and may define further design embodiments of the invention. Moreover, the features set forth are specified and explained in more detail in the description, wherein further preferred design embodiments of the invention are illustrated.

Proposed according to the invention is a side bracket for a link for a line-routing device. The side bracket has a longitudinal periphery which extends in a longitudinal direction of the side bracket and on which a running surface is formed. The side bracket has a roller which is mounted so as to be rotatable about an axle, wherein the axle is disposed so as to be parallel to the running surface and perpendicular to the longitudinal direction, wherein a spacing between the running surface and the axle is variable in a damped manner, and wherein the roller, at least in a first position, protrudes from the running surface.

The side bracket is suitable to be part of a link of a line-routing device. The link is suitable to be part of a line-routing device. A line-routing device serves for routing lines such as cables and/or hoses between members that are movable relative to one another. The lines here are protected by the line-routing device, in particular in relation to excessive bending. The line-routing device is preferably configured from a multiplicity of links. At least some of these links preferably have at least one side bracket which is configured as described. The side bracket described is in particular suitable for a line-routing device which has a loop composed of an upper lead, a deflection region, and a lower lead, wherein the upper lead (with the exception of a gap formed by the rollers) can bear on the lower lead. The deflection region here is defined such that the latter comprises that part of the line-routing device that does not bear on any other part of the line-routing device. In the case of this definition, the entire upper lead and the entire lower lead thus bear on one another. The upper lead and the lower lead can be moved past one another when the line-routing device is displaced. This movement is facilitated by rollers so that the movement can be referred to as a rolling movement. In comparison to a pure sliding action, a rolling movement has the advantage of lower friction and less wear.

The rollers are provided in the side brackets of the links. The side brackets of the links of a line-routing device are preferably disposed such that the side brackets form one or a plurality of side bracket strands. A side bracket strand is a series of side brackets lined up along a direction of propagation of the line-routing device. All links preferably have the same number of side brackets. If each link has exactly one side bracket, the side brackets of the links thus form exactly one side bracket strand. If each link has two side brackets, two side bracket strands are formed: a respective first side bracket of the links is part of a first side bracket strand, while a respective second side bracket of the links is part of a second side bracket strand. If each link has more than two side brackets, more than two side bracket strands are formed in an analogous manner.

The side bracket described has a running surface and a roller. If a link has exactly one side bracket, the latter thus has one running surface and one roller. The link thus has one running surface and one roller. If the link has two side brackets, each of these side brackets preferably has a respective running surface and a respective roller. The link thus has two running surfaces and two rollers. It is also possible that the link has a side bracket having a running surface and a roller, and a side bracket without a running surface and/or without a roller. In this case, the link has indeed two side brackets but only one running surface and/or only one roller. The same applies in an analogous manner to links having more than two side brackets.

The rollers of the links of the line-routing device can roll on the running surface: rollers of the links of the upper lead can roll on running surfaces of the links of the lower lead, and rollers of the links of the lower lead can roll on running surfaces of the links of the upper lead. The rollers and the running surface of the links of the deflection region remain unutilized. However, it is to be noted that the association of a link with the upper lead, with the deflection region, or with the lower lead can be different, depending on the position of the line-routing device. For instance, a link in a first position of the line-routing device can be part of the deflection region such that a roller and a running surface of this link are unutilized. In a second position of the line-routing device, the link in focus can however be part of the lower lead, for example, such that the roller of the link in focus can roll on the running surface of links of the upper lead, and that rollers of links of the upper lead can roll on the running surface of the link in focus.

The running surface of the side bracket described is formed on the longitudinal periphery of the side bracket. The longitudinal periphery of the side bracket is a peripheral face which is configured so as to be parallel to the longitudinal direction of the side bracket. The side bracket is preferably configured in such a manner that the longitudinal direction of the side bracket in the intended use of the side bracket runs along the direction of propagation of the line-routing device. The side brackets of a side bracket strand are preferably assembled in the longitudinal direction of the side brackets. This means that two sides of a side bracket that are mutually opposite in the longitudinal direction are in each case attached to one side bracket of an adjacent link.

A running surface of a side bracket strand is formed by the running surfaces of those side brackets which conjointly form that side bracket strand. The running surface of the side bracket strand can be understood to be a single running surface or, likewise, to be composed from the running surfaces of the individual side brackets. The description of the rollers of the links of the lower lead running on running surfaces of links of the upper lead is thus equivalent to the description of the rollers of the links of the lower lead running on the running surface of the corresponding side bracket strand in the region of the upper lead.

The running surface of a side bracket strand extends across the entire length of the line-routing device. Rollers can roll on the entire running surface. Nevertheless, not each roller can utilize the entire running surface. The rollers of the links of the lower lead can utilize only the running surface of the links of the upper lead; the rollers of the links of the upper lead can utilize only the running surface of the links of the lower lead; the rollers of the links of the deflection region cannot use the running surface at all. While the association between the links and the upper lead, the deflection region and the lower lead is variable, a deflection region having a minimum extent is in any case present between the lower lead and the upper lead. Accordingly, a roller thus cannot utilize the running surface of its own link, or of one or optionally even a plurality of adjacent links, in any case.

If the line-routing device has exactly one side bracket strand, there is exactly one running surface on which the rollers can roll. If the line-routing device has a plurality of side bracket strands, the rollers in side brackets of a first side bracket strand can roll on the running surface of the first side bracket strand, and the rollers in side brackets of a second side bracket strand can roll on the running surface of the second side bracket strand. The same applies in an analogous manner if the line-routing device has more than two side bracket strands.

The roller of the side bracket described is mounted on the axle in such a manner that the roller is movable transversely to the running surface of the side bracket. Accordingly, the spacing between the axle and the running surface is varied. The spacing between the axle and the running surface is the shortest distance between the axle and the running surface. Because the axle and the running surface are mutually parallel, the spacing at different locations of the axle, or of the running surface, respectively, is identical. The spacing is thus defined so as to be perpendicular to the running surface and to the axle.

The roller is preferably fixedly mounted on the axle. A movement of the axle consequently takes place conjointly with a movement of the roller. The roller is preferably configured so as to be rigid. A roller surface of the roller is consequently moved parallel to the axle. Alternatively, it is preferable for the roller to be configured so as to be at least in part flexible. As a result, shocks can be damped even more intensely.

The axle is disposed so as to be parallel to the running surface and perpendicular to the longitudinal direction of the side bracket. A rolling direction of the roller is thus parallel to the longitudinal direction of the side bracket. The disposal of the axle relative to the running surface and to the longitudinal direction relates to a normal state in which the roller is not stressed by external forces. The axle of the roller can be held within the side bracket in such a manner that the roller can be tilted by an external force acting thereon. The axle of the roller thus can be held in the side bracket by way of dampers, for example. As a result, the axle can be tilted relative to the running surface and/or to the longitudinal direction. However, this does not have any effect on the described definition of the disposal of the axle relative to the running surface and to the longitudinal direction, because this definition relates to the normal state.

The roller, at least in the first position, protrudes from the running surface. The roller is thus disposed in the side bracket in such a manner that, in the first position, part of the roller is situated outside the side bracket in such a manner that this part projects beyond the running surface of the side bracket.

When a roller from the upper lead and a roller from the lower lead collide when the line-routing device is being displaced, a shock can be prevented or at least damped as a result of the damped variability of the spacing of the rollers from the running surface. The reason lies in that a spacing between the running surface of the upper lead and the running surface of the lower lead, as a result of the damped mobility, can remain constant or is in any case subjected to only a minor variation when the rollers collide. For example, the rollers in the normal state can be present in the first position, thus protrude from the running surface. The normal state can in particular be present unless two rollers collide. If two rollers collide, the two rollers can be moved into the respective running surface in such a manner that both rollers no longer protrude from this running surface or only protrude therefrom to a minor extent. Alternatively, one of the two rollers can remain unchanged, and the other of the two rollers can be moved into the respective running surface in such a manner that this roller no longer protrudes from this running surface or protrudes therefrom only to a minor extent. The movement of the two rollers, or of the one roller, respectively, into the running surface preferably takes place exactly to the extent that the mutual spacing between the two running surfaces remains constant when the rollers collide. To this end, the two rollers can be moved into the respective running surface in such a manner, for example, that the rollers protrude from the respective running surface only half as much as in the normal state. Alternatively, one of the two rollers can be moved completely into the respective running surface such that this roller no longer protrudes from the running surface at all. The other of the two rollers can remain in the first position.

When two rollers collide, this thus does not result in a shock, or only in a diminished shock. This prevents or reduces, respectively, vibrations in the line-routing device. The reduction of vibrations here goes beyond simple damping of the rollers. The reason therefor is that the damped mobility of the rollers described is of significance in particular when two rollers collide. Simple damping is aimed at compensating for shocks by virtue of unevennesses in a running surface. The unevennesses here can be of any type. In contrast, the case of two rollers mounted so as to be equally mobile colliding with one another is more special because it is not only an arbitrary unevenness that is to be compensated for.

According to a preferred embodiment of the side bracket, a variability of the spacing between the running surface and the axle is restricted to the first position of the roller and to a second position of the roller.

In this embodiment, the roller can be moved only between the first position and the second position but not beyond the first position or beyond the second position. This restriction can be achieved by detents. For example, if the axle is mounted by springs, overloading of the springs can be prevented as a result of the movement of the roller being restricted.

According to a further preferred embodiment of the side bracket, the roller in the second position protrudes from the running surface.

In this embodiment, the roller thus protrudes from the running surface in the first position as well as in the second position. The movement of the roller transverse to the running surface is thus restricted so that an extent of this protrusion is variable. A mobility of the roller restricted in such a manner reduces the complexity in terms of construction. Also, this restricted mobility is sufficient. Finally, the damped mobility of the spacing between the axle and the running surface primarily serves for avoiding or mitigating shocks when two rollers collide with one another. The extent to which the individual rollers have to be moved to this end is limited. For example, the height of a gap between the upper lead and the lower lead can be kept constant in that two colliding rollers are in each case pushed into the respective side bracket by half of the height of this gap. If arbitrary unevennesses on the running surface are to be compensated for, it would be preferable for the roller in the second position not to protrude from the running surface. However, no contamination or damage which would require such pronounced damping usually arises in line-routing devices. It thus suffices that the individual rollers can be pushed somewhat into the side brackets. It is not necessary for the rollers to be able to be pushed completely into the side brackets.

Alternatively, the embodiment of the link in which the roller in the second position does not protrude from the running surface is preferable.

According to a further preferred embodiment of the side bracket, a spacing between the running surface and the axle in the first position of the roller is smaller by 0.5% to 10% of a roller diameter than in the second position of the roller.

The roller diameter is defined so as to be perpendicular to the axle of the roller. In the case of a deformable roller, the roller diameter is defined in the normal state in which no external force acts on the roller. In terms of this roller diameter, the variability of the spacing is defined between the axle and the running surface. The roller diameter can in particular be measured along the direction along which the axle, and thus also the roller, can be moved. The roller can be moved in this direction by 0.5% to 10% of the extent of said roller. This is sufficient in order to avoid or at least mitigate shocks when two rollers collide with one another. A higher degree of mobility of the axle and a correspondingly greater complexity in terms of construction can be dispensed with. Consequently, the construction of the side bracket in the present embodiment is particularly simple.

According to a further preferred embodiment, the side bracket has a roller support in which the roller is mounted and which is held in a receptacle of the side bracket by way of a damping device.

The side bracket has a receptacle in which the roller support is accommodated. The receptacle is preferably larger than the roller support in such a manner that the movement of the roller transverse to the running surface, between the first position and the second position, is possible by moving the roller support within the receptacle. The roller support is held in the receptacle by way of the damping device. To this extent, the roller support is movable in a damped manner within the receptacle. The roller is preferably mounted in the roller support in such a manner that the axle of the roller can be moved conjointly with the roller support. Consequently, the roller can also be moved as a result of the movement of the roller support.

The mounting of the roller on the roller support is possible in that, for example, a first part of the roller support is disposed on a first side of the roller, and that a second part of the roller support is disposed on a second side of the roller that lies opposite the first side. In this case, the axle preferably extends from the first part of the roller support, through the roller, to the second part of the roller support.

According to a further preferred embodiment of the side bracket, the roller support has a first detent which, in the first position of the roller, contacts a periphery of the receptacle, as a result of which the variability of the spacing between the running surface and the axle is restricted.

According to a further preferred embodiment of the side bracket, the roller support has a second detent which, in the second position of the roller, contacts a periphery of the receptacle, as a result of which the variability of the spacing between the running surface and the axle is restricted.

The combination of these two embodiments is preferable. The roller support here has the first detent as well as the second detent.

The roller support can be moved in the receptacle so as to enable the variability of the spacing between the running surface and the axle. The roller can preferably be moved only between the first position and the second position, but not beyond the first position, or beyond the second position, respectively. This restriction is possible by the corresponding detent. If the roller support impacts the periphery of the receptacle, the roller support and thus also the roller cannot be moved any further. In the first position, the first detent contacts the periphery of the receptacle, and/or in the second position, the second detent contacts the periphery of the receptacle. The first detent in the first position contacts another part of the periphery of the receptacle than the second detent in the second position.

The first detent is preferably formed by a first side of the roller support that faces the running surface. If the roller support has a first part on the first side of the roller and a second part on the second side of the roller, the first detent is preferably formed by a first side of the first part that faces the running surface, and by a first side of the second part that faces the running surface. The first detent thus does not have to be configured as a contiguous surface but can also be composed of a plurality of sub-parts which can in particular be mutually separated by the roller.

Accordingly, the second detent is preferably formed by a second side of the roller support that faces away from the running surface. If the roller support has a first part on the first side of the roller and a second part on the second side of the roller, the second detent is preferably formed by a second side of the first part that faces away from the running surface and a second side of the second part that faces away from the running surface. The second detent thus does not have to be configured as a contiguous surface but can also be composed of a plurality of sub-parts which can in particular be mutually separated by the roller.

According to a further preferred embodiment of the side bracket, the damping device has four dampers which are disposed in the shape of a rectangle disposed so as to be parallel to the running surface.

The dampers are preferably springs, elements made from a flexible plastics material, or pneumatic and/or hydraulic dampers.

The arrangement in the form of a rectangle is present when the dampers are situated in the four corners of the rectangle. The edges of the rectangle do not have to be defined by physical features. It suffices that the dampers are disposed in such a manner that an imaginary rectangle is defined by said dampers.

It is preferable, in particular in this embodiment, that the roller support has a first part on the first side of the roller, and a second part on the second side of the roller. Each of the two parts in this embodiment can in each case be damped by two dampers.

Two mutually parallel sides of the rectangle are preferably parallel to an axle of the roller.

It has been demonstrated that, as a result of the described arrangement of the dampers, the roller can be moved out of the running surface in a particularly reliable manner when the roller collides with another roller. As a result of the symmetrical arrangement of the dampers, tilting of an axle of the roller can in particular be prevented.

According to a further preferred embodiment of the side bracket, the roller support has a first side that faces the running surface and is curved in the direction toward the running surface.

The curvature of the first side is preferably present only when viewed in a plane which is perpendicular to the running surface and perpendicular to the axle of the roller. That part of the periphery of the receptacle that is contacted by the first side of the roller support in the first position is preferably likewise curved. The first side of the roller support in the first position can thus be in contact with this part of the periphery across the entire surface. To this extent, the first side of the roller support forms the first detent. As a result of the curvature, the first detent not only restricts the movement of the roller transverse to the running surface. Moreover, the curvature also ensures centering of the roller support. This can stabilize the roller support and the roller.

If the roller support has a first part on the first side of the roller, and a second part on the second side of the roller, it is preferable for the first part of the roller support and the second part of the roller support to have a respective first side that faces the running surface and is in each case curved in the direction toward the running surface.

According to a further preferred embodiment of the side bracket, the roller support has a second side that faces away from the running surface and in the central region is curved in the direction away from the running surface.

According to a further preferred embodiment of the side bracket, the second side of the roller support outside the central region has two plateaus which are parallel to the running surface, one damper of the damping device engaging on each of said two plateaus.

The combination of these two embodiments is preferable. Here, the roller support has a second side that faces away from the running surface and in a central region is curved in a direction away from the running surface and outside the central region has two plateaus which are parallel to the running surface, one damper of the damping device engaging on each of said two plateaus.

The curvature of the second side in the central region is preferably present only when viewed in a plane which is perpendicular to the running surface and perpendicular to the axle of the roller. That part of the periphery of the receptacle that is contacted by the central region of the second side of the roller support in the second position is preferably likewise curved. The central region of the second side of the roller support in the second position can thus be in contact with this part of the periphery across the entire surface. To this extent, the central region of the second side of the roller support forms the second detent. As a result of the curvature, the second detent not only restricts the movement of the roller transverse to the running surface. Moreover, the curvature also ensures centering of the roller support. This can stabilize the roller support and the roller.

If the roller support has a first part on the first side of the roller and a second part on the second side of the roller, it is thus preferable that the first part of the roller support and the second part of the roller support have a respective second side that faces away from the running surface, said second sides in a respective central region being curved in the direction away from the running surface. Outside the central region, these two sides preferably have in each case two plateaus which are parallel to the running surface, one damper of the damping device engaging on each of said two plateaus. The roller support thus has a total of four of the plateaus so that four dampers can be received.

If the curvature of the second side in the central region is present only when viewed in a plane which is perpendicular to the running surface and perpendicular to the axle of the roller, a respective plateau which adjoins the curvature is preferably provided on both sides of the curvature.

It has been demonstrated that, as a result of the configuration of the plateaus, the dampers can engage on the roller support in a particularly compact manner.

Proposed according to a further aspect of the invention is a link for a line-routing device. The link comprises at least two side brackets which are disposed so as to be mutually parallel and which are connected to one another by way of at least one transverse web. At least one of the two side brackets is configured as described.

The described particular advantages and design embodiment features of the side bracket can be applied and transferred to the link, and vice versa.

The link preferably has exactly two of the side brackets. In this case, the link described is suitable for a line-routing device which has exactly two side bracket strands. A first of the two side brackets of the link described can be part of a first one of these two side bracket strands; a second of the two side brackets of the link described can be part of a second one of these two side bracket strands.

The two side brackets are disposed so as to be mutually parallel so that two parallel side bracket strands can be obtained. The lines which are routed by the line-routing device described can be disposed between the two side bracket strands.

The running surfaces of the two side brackets are aligned so as to be mutually parallel. The running surfaces of the two side brackets preferably lie in a common (imaginary) plane.

All side brackets of the link are preferably configured as described. However, the link can also have one or a plurality of side brackets which are of a different configuration, in particular in that no roller is provided in these side brackets. In any case, these side brackets preferably have a longitudinal periphery which extends in the longitudinal direction of the corresponding side bracket and on which a corresponding running surface is formed. While these side brackets indeed have no roller, they do form at least part of the running surface.

Proposed according to a further aspect of the invention is a line-routing device having a multiplicity of links which are connected to one another in an articulated manner. The links form a loop composed of an upper lead, a deflection region, and a lower lead. Side brackets of the links form at least one side bracket strand having a respective running surface on a loop internal side. At least some of the links comprise in each case at least one side bracket which has a longitudinal periphery which extends in a longitudinal direction of the side bracket and on which part of the running surface of the corresponding side bracket strand is formed, and has a roller which is mounted so as to be rotatable about an axle, wherein the axle is disposed so as to be parallel to the running surface of the corresponding side bracket and perpendicular to the longitudinal direction, wherein a spacing between the running surface of the corresponding side bracket and the axle is variable in a damped manner, and wherein the roller, at least in a first position, protrudes from the running surface of the corresponding side bracket.

The upper lead and the lower lead, by way of the running surface of the at least one side bracket strand, can bear on one another in such a manner that the upper lead and the lower lead are displaceable relative to one another by means of the rollers.

The described particular advantages and design embodiment features of the side bracket and of the link can be applied and transferred to the line-routing device and vice versa. It is particularly preferable that at least one of the side brackets of the links, preferably all side brackets of the links, is/are configured having a roller as described. This means that these side brackets have the features described and, optionally, also one or a plurality of the features of the side bracket that are described as preferable. This applies individually to each of the side brackets of each of the links having a roller so that these links do not have to be configured in a mutually identical manner. However, it is preferable for the links having a roller to be configured in a mutually identical manner. The line-routing device can also have links without a roller. These links preferably comprise at least one side bracket having a running surface. The running surface of a side bracket strand is formed by the running surfaces of the links (with or without a roller) of this side bracket strand. It is not necessary for the running surface to be continuously configured. In particular, the line-routing device can have links with or without rollers that are configured in a manner different from that described. The running surface may also be interrupted by links of this type.

The links of the line-routing device are preferably connected to one another in an articulated manner such that the loop composed of the upper lead, the deflection region, and the lower lead can be formed by the links. It is particularly preferable for adjacent links to be mutually pivotable about a pivot axle which is configured so as to be parallel to the running surface and perpendicular to the direction of propagation of the line-routing device. The pivot axles are preferably disposed so as to be parallel to the axles of the rollers.

The loop has a loop internal side and a loop external side. The running surface, or the plurality of running surfaces, is/are configured on the loop internal side. The upper lead and the lower lead, by way of the respective loop internal sides, can be guided past one another, in particular by means of the rollers. This means that rollers of the links of the upper lead can roll on running surfaces of the links of the lower lead, and that rollers of the links of the lower lead can run on running surfaces of the links of the upper lead.

The invention and the technical field will be discussed in more detail below on the basis of the figures. It is pointed out that the invention is not intended to be restricted by the exemplary embodiment shown. In particular, unless explicitly presented otherwise, it is also possible for partial aspects of the substantive matter discussed in the figures to be extracted and combined with other constituent parts and knowledge from the present description and/or figures. It is to be pointed out in particular that the figures and in particular the size ratios illustrated are only schematic. The same reference signs are used to denote identical objects, such that, where appropriate, explanations from other figures can be taken into consideration in a supplementary manner. In the figures.

Figure 1:
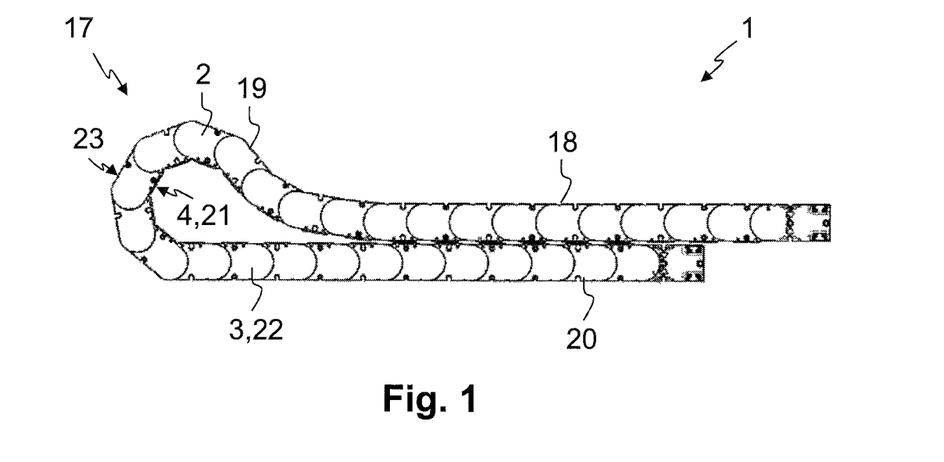
FIG. 1: shows a lateral view of a line-routing device according to the invention.

FIG. 1 shows a line-routing device 1 having a multiplicity of links 2 which are connected to one another in an articulated manner. The links 2 form a loop 17 composed of an upper lead 18, a deflection region 19, and a lower lead 20. With the exception of a gap, the upper lead 18 bears on the lower lead 20. Side brackets 3 of the links 2 form two side bracket strands 22 having a respective running surface 4. Only one of the side bracket strands 22 can be seen in the illustration of FIG. 1; a further side bracket strand of identical configuration is disposed so as to be perpendicular to the drawing plane behind the side bracket strand 22 shown. The side bracket strands 22 are connected to one another by way of transverse webs which are aligned so as to be perpendicular to the drawing plane. The loop 17 has a loop internal side 21 and a loop external side 23. The running surface 4 is configured on the loop internal side 21.

Figure 2:
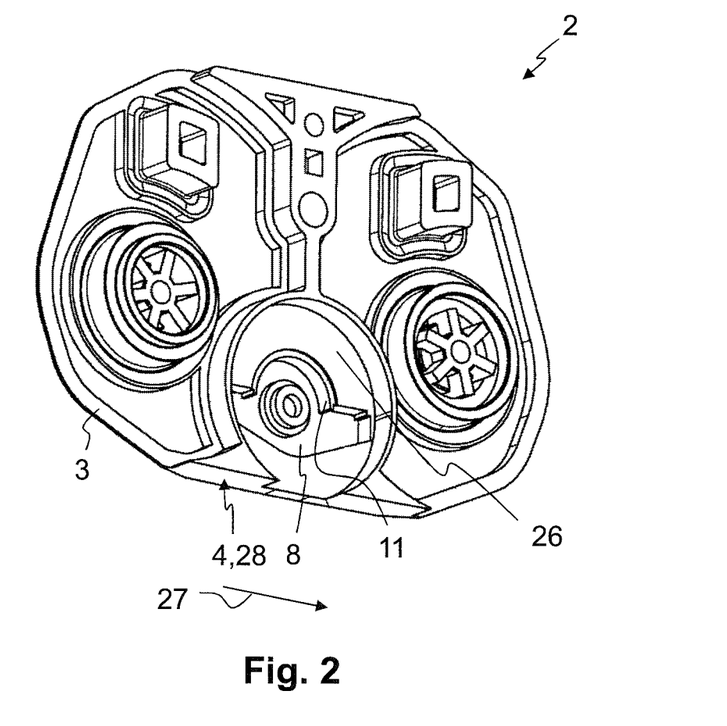
FIG. 2: shows a first perspective view of part of a link of the line-routing device from FIG. 1.

FIG. 2 shows a first perspective view of part of a link 2 of the line-routing device 1 from FIG. 1. The link 2 has a side bracket 3 which is only partially shown. The side bracket 3 has a roller receptacle 26 and a receptacle 8 for a roller support 6 (shown in FIGS. 3 to 6). A periphery 11 of the receptacle 8 is plotted. The running surface 4 is also plotted. The running surface 4 is configured on a longitudinal periphery 28 of the side bracket 3. The longitudinal periphery 28 extends in a longitudinal direction 27 of the side bracket 3.

Figure 3:
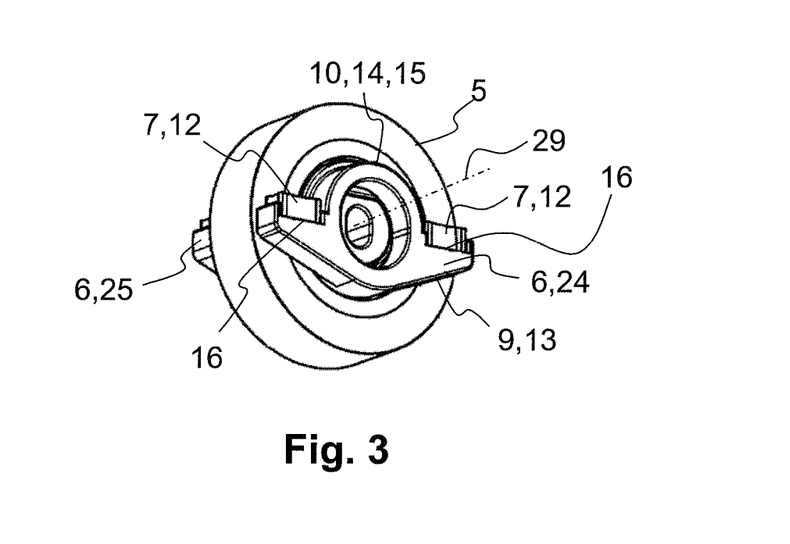
FIG. 3: shows a second perspective view of part of the link from FIG. 2.

FIG. 3 shows a second perspective view of an(other) part of the link 2 from FIG. 2. Shown here is a roller 5 having the roller support 6. The roller support 6 has a first part 24 and a second part 25 which are disposed on different sides of the roller 5. The roller 5 is mounted so as to be rotatable about an axle 29. The axle 29 is disposed so as to be parallel to the running surface 4, shown for example in FIG. 2, and so as to be perpendicular to the longitudinal direction 27, likewise shown in FIG. 2.

Furthermore plotted is a damping device 7. The latter has four dampers 12, two of which can be seen. The two dampers obscured in the view of FIG. 3 are disposed on the second part 25 of the roller support 6 in the same way as the two visible dampers 12 are disposed on the first part 24 of the roller support 6. The four dampers 12 are disposed in the shape of a rectangle which is disposed parallel to the running surface 4. The rectangle is only imaginary. The edges of the rectangle are not defined by physical features.

The roller support 6 has a first side 13 which (in the installed state) faces the running surface 4 and which is curved in the direction toward the running surface 4. This applies to the first part 24 of the roller support 6 as well as to the second part 25 of the roller support 6. The first side 13 forms a first detent 9. Moreover, the roller support 6 has a second side 14 which (in the installed state) faces away from the running surface 4 and which in a central region 15 is curved in the direction away from the running surface 4. This also applies to the first part 24 of the roller support 6 as well as to the second part 25 of the roller support 6. Outside the central region 15, the second side 14 of the roller support 6 has two plateaus 16 which are parallel to the running surface 4, one of the dampers 12 of the damping device 7 engaging on each of said two plateaus 16. This also applies to the first part 24 of the roller support 6 as well as to the second part 25 of the roller support 6, so that the damping device 7 has a total of four dampers 12. The second side 14 forms a second detent 10.

Figure 4:
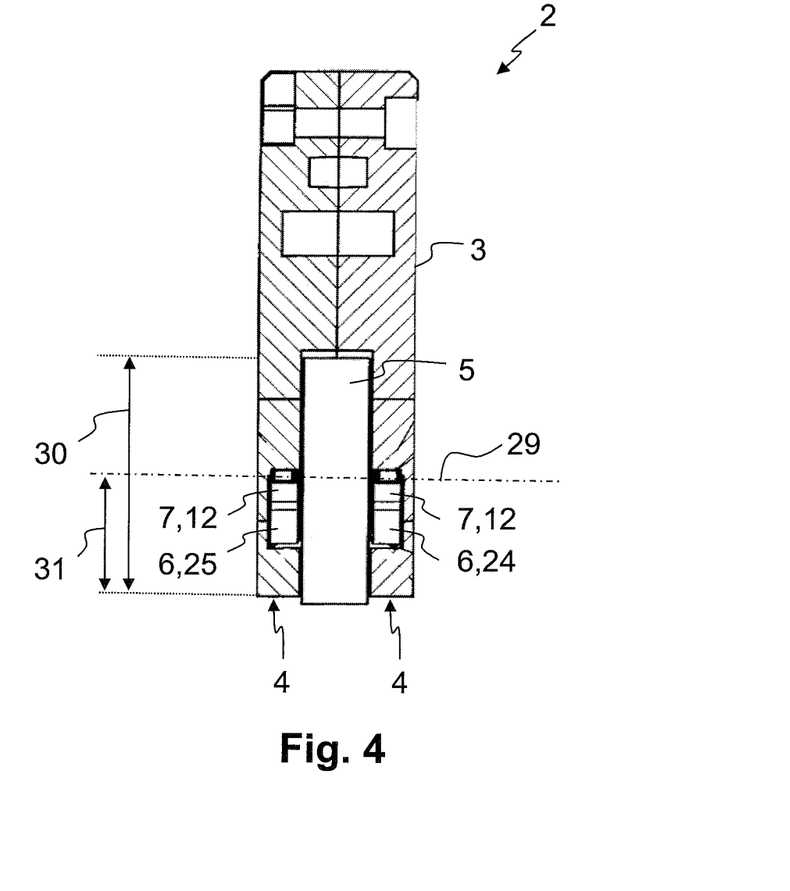
FIG. 4: shows a sectional illustration of the link from FIGS. 2 and 3.

FIG. 4 shows a sectional illustration of a side bracket 3 of the link 2 from FIGS. 2 and 3. It can be seen that the link 2 in the side bracket 3 shown has the roller 5 which protrudes from the running surface 4. Likewise to be seen is the roller support 6 having the first part 24 and the second part 25. The damping device 7 having the dampers 12 can also be seen.

Furthermore plotted is a spacing 31 between the axle 29 and the running surface 4. This spacing 31 is variable in a damped manner between a first position of the roller and a second position of the roller. The variability of the spacing 31 is thus restricted to the first position and the second position of the roller 5. Furthermore plotted is a roller diameter 30. The spacing 31 in the first position of the roller 5 is smaller by 0.5% to 10% of the roller diameter 30 than in the second position of the roller 5.

Figure 5:
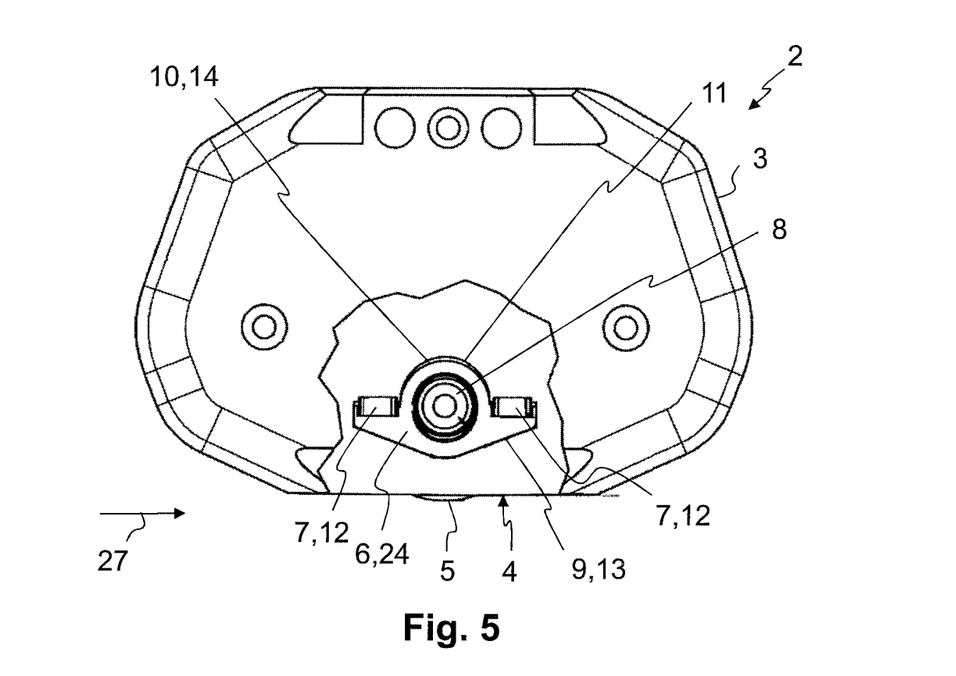
FIG. 5: shows a first lateral view of the link from FIGS. 2 to 4.
Figure 6:
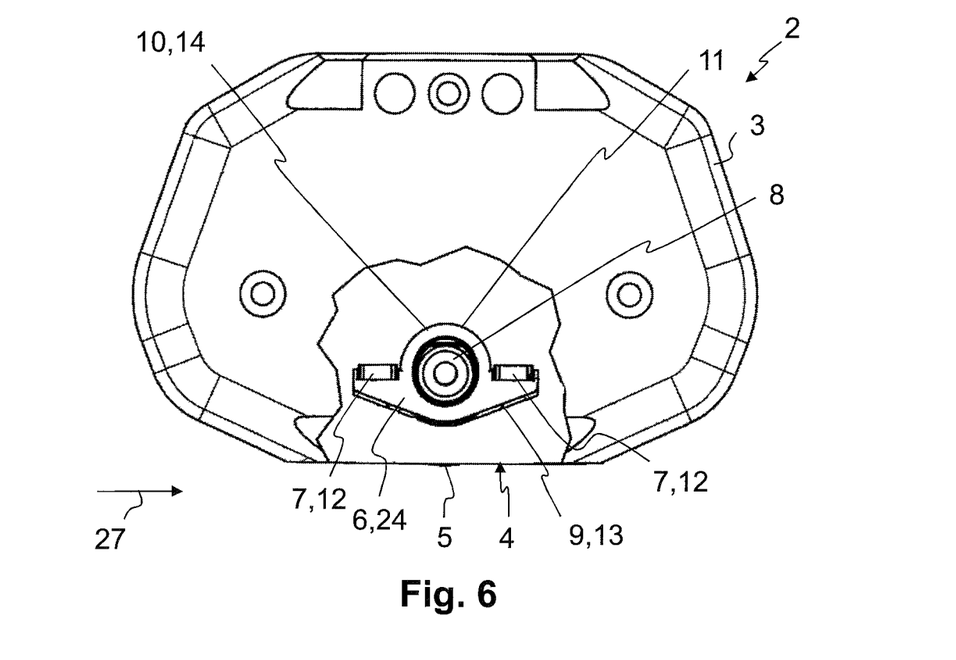
FIG. 6: shows a second lateral view of the link from FIGS. 2 to 5.

FIGS. 5 and 6 show lateral views of the link 2 from FIGS. 2 to 4, said lateral views being largely identical. It can be seen that the roller 5 is mounted in such a manner that the spacing 31 between the running surface 4 and the axle 29 is variable in a damped manner between a first position (FIG. 5) and a second position (FIG. 6). The roller 5 protrudes from the running surface 4 in the first position (FIG. 5) as well as in the second position (FIG. 6). Alternatively however, the roller 5 could also be mounted in such a manner that the roller 5 in the second position does not protrude from the running surface 4 (as opposed to the embodiment in FIG. 6).

It can furthermore be seen in FIGS. 5 and 6 that the side bracket 3 has the roller support 6 of which only the first part 24 can be seen in each case. The roller 5 is mounted in the roller support 6. The roller support 6 is held in the receptacle 8 of the side bracket 3 by way of the damping device 7 having the dampers 12.

The roller support 6 has a first detent 9 which in the first position (FIG. 5) of the roller 5 contacts a periphery 11 of the receptacle 8, as a result of which the variability of the spacing 31 is restricted. The first detent 9 is formed on a first side 13 of the roller support 6. Moreover, the roller support 6 has a second detent 10 which in the second position (FIG. 6) of the roller 5 contacts a periphery 11 of the receptacle 8, as a result of which the variability of the spacing 31 is restricted. The second detent 10 is formed on a second side 14 of the roller support 6.

Figure 7:
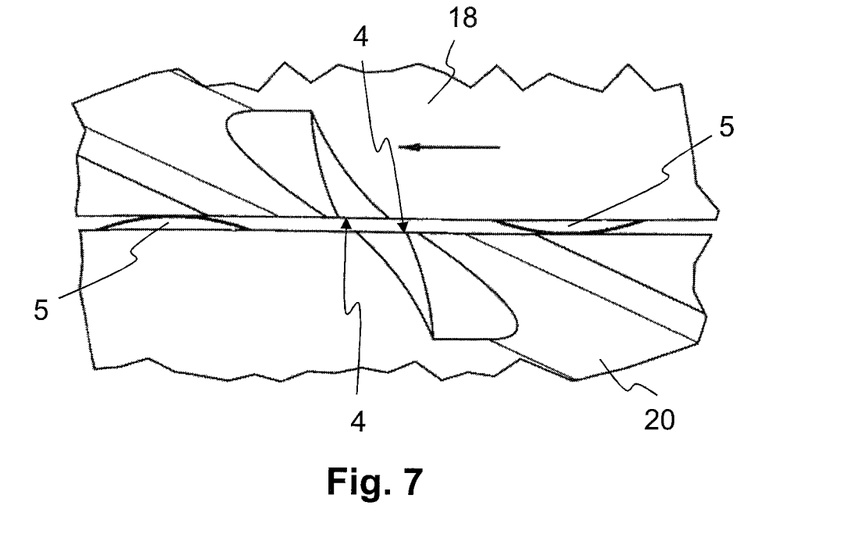
FIG. 7: shows a first lateral sectional illustration of part of the line-routing device from FIG. 1.
Figure 8:
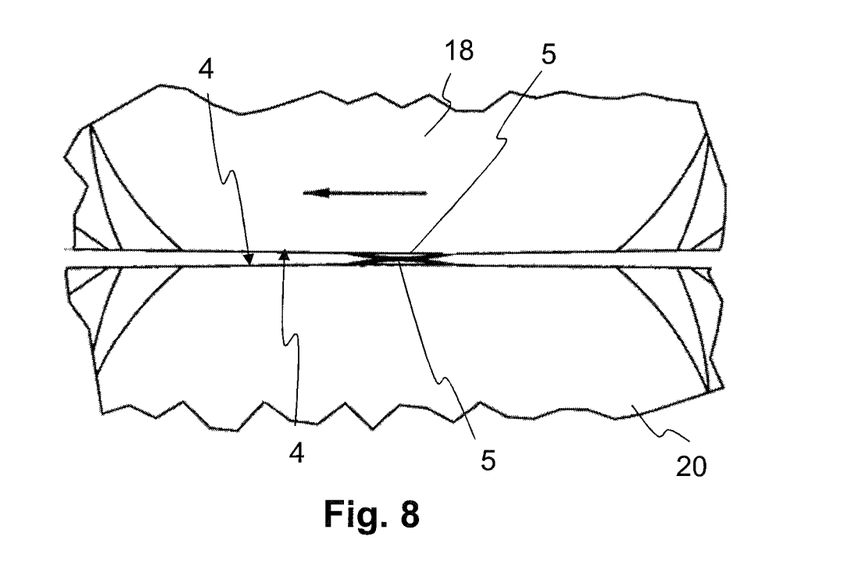
FIG. 8: shows a second lateral sectional illustration of part of the line-routing device from FIG. 1.

FIGS. 7 and 8 show lateral sectional illustrations of part of the line-routing device 1 from FIG. 1. It can be seen that the upper lead 18 and the lower lead 20, by way of the running surface 4, interact with one another in such a manner that the upper lead 18 and the lower lead 20 are displaceable relative to one another by means of the rollers 5.

LIST OF REFERENCE SIGNS

1 Line-routing device
2 Link
3 Side bracket
4 Running surface
5 Roller
6 Roller support
7 Damping device
8 Receptacle
9 First detent
10 Second detent
11 Periphery
12 Damper
13 First side
14 Second side
15 Central region
16 Plateau
17 Loop
18 Upper lead
19 Deflection region
20 Lower lead
21 Loop internal side
22 Side bracket strand
23 Loop external side
24 First part
25 Second part
26 Roller receptacle
27 Longitudinal direction
28 Longitudinal periphery
29 Axle
30 Roller diameter
31 Spacing

The invention claimed is:

1. A side bracket for a link for a line-routing device, wherein the side bracket has a longitudinal periphery which extends in a longitudinal direction of the side bracket and on which a running surface is formed, wherein the side bracket has a roller which is mounted so as to be rotatable about an axle, wherein the axle is disposed so as to be parallel to the running surface and perpendicular to the longitudinal direction, wherein a spacing between the running surface and the axle is variable in a damped manner, and wherein the roller, at least in a first position, protrudes from the running surface.

2. The side bracket as claimed in claim 1, wherein a variability of the spacing between the running surface and the axle is restricted to the first position of the roller and to a second position of the roller.

3. The side bracket as claimed in claim 2, wherein the roller in the second position protrudes from the running surface.

4. The side bracket as claimed in claim 2, wherein the spacing between the running surface and the axle in the first position of the roller is smaller by 0.5% to 10% of a roller diameter than in the second position of the roller.

5. The side bracket as claimed in claim 1, furthermore having a roller support in which the roller is mounted and which is held in a receptacle of the side bracket by way of a damping device.

6. The side bracket as claimed in claim 5, wherein the roller support has a first detent which, in the first position of the roller, contacts a periphery of the receptacle, as a result of which the variability of the spacing between the running surface and the axle is restricted.

7. The side bracket as claimed in claim 5, wherein the roller support has a second detent which, in a second position of the roller, contacts a periphery of the receptacle, as result of which the variability of the spacing between the running surface and the axle is restricted.

8. The side bracket as claimed in claim 5, wherein the damping device has four dampers which are disposed in the shape of a rectangle disposed so as to be parallel to the running surface.

9. The side bracket as claimed in claim 5, wherein the roller support has a first side that faces the running surface and is curved in the direction toward the running surface.

10. The side bracket as claimed in claim 9, wherein the roller support has a second side that faces away from the running surface and in a central region is curved in the direction away from the running surface.

11. The side bracket as claimed in claim 10, wherein the second side of the roller support outside the central region has two plateaus which are parallel to the running surface, one damper of the damping device engaging on each of said two plateaus.

12. A link for a line-routing device, comprising at least two side brackets which are disposed so as to be mutually parallel and which are connected to one another by way of at least one transverse web, and wherein at least one of the two side brackets has a longitudinal periphery which extends in a longitudinal direction of the side bracket and on which a running surface is formed, wherein the side bracket has a roller which is mounted so as to be rotatable about an axle, wherein the axle is disposed so as to be parallel to the running surface and perpendicular to the longitudinal direction, wherein a spacing between the running surface and the axle is variable in a damped manner, and wherein the roller, at least in a first position, protrudes from the running surface.

13. A line-routing device having a multiplicity of links which are connected to one another in an articulated manner and which form a loop composed of an upper lead, a deflection region, and a lower lead, wherein side brackets of the links form at least one side bracket strand having a respective running surface on a loop internal side, wherein at least some of the links comprise in each case at least one side bracket which
- has a longitudinal periphery which extends in a longitudinal direction of the side bracket and on which part of the running surface of the corresponding side bracket strands is formed, and
- has a roller which is mounted so as to be rotatable about an axle, wherein the axle is disposed so as to be parallel to the running surface of the corresponding side bracket and perpendicular to the longitudinal direction, wherein a spacing between the running surface of the corresponding side bracket and the axle is variable in a damped manner, and wherein the roller, at least in a first position, protrudes from the running surface of the corresponding side bracket, and
- wherein the upper lead and the lower lead, by way of the running surface of the at least one side bracket strand, can bear on one another in such a manner that the upper lead and the lower lead are displaceable relative to one another by means of the rollers.

14. The line-routing device as claimed in claim 13, wherein at least one of the side brackets of the links is configured having a roller which is mounted so as to be rotatable about an axle, wherein the axle is disposed so as to be parallel to the running surface and perpendicular to the longitudinal direction, wherein a spacing between the running surface and the axle is variable in a damped manner, and wherein the roller, at least in a first position, protrudes from the running surface.

* * * * *

UNITED STATES PATENT AND TRADEMARK OFFICE
CERTIFICATE OF CORRECTION

PATENT NO. : 12,051,890 B2
APPLICATION NO. : 17/768638
DATED : July 30, 2024
INVENTOR(S) : Uwe Kemper

Page 1 of 1

It is certified that error appears in the above-identified patent and that said Letters Patent is hereby corrected as shown below:

In the Claims

Claim 7, Column 13, Line 3, reads "claim 5" should read --claim 6--.

Signed and Sealed this
Twenty-fourth Day of September, 2024

Katherine Kelly Vidal
*Director of the United States Patent and Trademark Office*